(12) United States Patent
Fukushima et al.

(10) Patent No.: US 10,962,018 B2
(45) Date of Patent: Mar. 30, 2021

(54) GAS DYNAMIC PRESSURE BEARING, MOTOR, AND BLOWER

(71) Applicant: Nidec Corporation, Kyoto (JP)

(72) Inventors: Kazuhiko Fukushima, Kyoto (JP); Takehito Tamaoka, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 16/787,066

(22) Filed: Feb. 11, 2020

(65) Prior Publication Data
US 2020/0309139 A1 Oct. 1, 2020

(30) Foreign Application Priority Data

Mar. 29, 2019 (JP) .............................. JP2019-065657

(51) Int. Cl.
| | | |
|---|---|---|
| *F16C 17/02* | (2006.01) | |
| *F16C 33/10* | (2006.01) | |
| *F16C 32/06* | (2006.01) | |
| *F04D 25/06* | (2006.01) | |
| *F04D 29/056* | (2006.01) | |

(Continued)

(52) U.S. Cl.
CPC .......... *F04D 25/062* (2013.01); *F16C 17/026* (2013.01); *F16C 32/0607* (2013.01); *F16C 33/107* (2013.01); *F04D 19/002* (2013.01); *F04D 29/047* (2013.01); *F04D 29/056* (2013.01); *F05B 2240/50* (2013.01); *F16C 2360/46* (2013.01)

(58) Field of Classification Search
CPC .......................... F16C 17/026; F16C 32/0607; F16C 33/1005; F16C 33/107; F04D 19/002; F04D 25/062; F04D 29/047; F04D 29/057; F04D 29/056; F05B 2240/50
USPC ................ 384/100, 107, 109, 114–115, 120; 417/264, 352
See application file for complete search history.

(56) References Cited

U.S. PATENT DOCUMENTS

| | | | | |
|---|---|---|---|---|
| 5,593,230 A | * | 1/1997 | Tempest | F16C 17/028 384/100 |
| 5,746,515 A | * | 5/1998 | Takahashi | F16C 17/026 384/115 |

(Continued)

FOREIGN PATENT DOCUMENTS

| | | | | |
|---|---|---|---|---|
| CN | 101294601 A | * | 10/2008 | F16C 33/1075 |
| CN | 105190062 A | * | 12/2015 | F16C 33/104 |

(Continued)

*Primary Examiner* — Marcus Charles
(74) *Attorney, Agent, or Firm* — Keating & Bennett

(57) ABSTRACT

A gas dynamic pressure bearing includes a shaft centered on a central axis extending in an up-down direction, and a sleeve that faces at least a portion of the shaft in a radial direction. The portion in which the sleeve and the shaft face each other in the radial direction includes a first dynamic pressure portion at each of both ends in the axial direction, and a second dynamic pressure portion between the first dynamic pressure portions. In the first dynamic pressure portion, one of the sleeve and the shaft includes dynamic pressure grooves arranged in a circumferential direction. A sum of center angles of groove widths of the dynamic pressure grooves in a cross-section cut along a plane orthogonal to the central axis is about 144° or more and about 216° or less.

10 Claims, 15 Drawing Sheets

(51) Int. Cl.
*F04D 19/00* (2006.01)
*F04D 29/047* (2006.01)

(56) References Cited

U.S. PATENT DOCUMENTS

| | | | | |
|---|---|---|---|---|
| 5,997,180 | A * | 12/1999 | Ishizuka | F16C 17/028 384/100 |
| 8,449,189 | B2 | 5/2013 | Takahashi et al. | |
| 2008/0267545 | A1 * | 10/2008 | Shih | F16C 33/1075 384/117 |
| 2013/0004351 | A1 * | 1/2013 | Hirono | F04D 29/063 417/423.13 |

FOREIGN PATENT DOCUMENTS

| | | | | | |
|---|---|---|---|---|---|
| CN | 107781293 | A * | 3/2018 | | F16C 17/10 |
| DE | 102015015162 | A1 * | 6/2017 | | F16C 17/026 |
| EP | 0837257 | B1 * | 10/2004 | | F16C 17/028 |
| JP | 2000-304037 | A | 10/2000 | | |
| JP | 2004044639 | A * | 2/2004 | | F16C 17/026 |
| JP | 2017166575 | A * | 9/2017 | | F16C 33/107 |
| WO | WO-0204825 | A1 * | 1/2002 | | F16C 17/02 |
| WO | WO-2004063581 | A1 * | 7/2004 | | F16C 17/107 |
| WO | WO-2012098797 | A1 * | 7/2012 | | F04D 29/023 |
| WO | WO-2014148179 | A1 * | 9/2014 | | H02K 7/08 |
| WO | WO-2015045784 | A1 * | 4/2015 | | G11B 19/2036 |

* cited by examiner

GAS DYNAMIC PRESSURE BEARING, MOTOR, AND BLOWER

CROSS REFERENCE TO RELATED APPLICATION

The present disclosure claims priority under 35 U.S.C. § 119 to Japanese Application No. 2019-065657 filed on Mar. 29, 2019, the entire contents of which are hereby incorporated herein by reference.

1. FIELD OF THE DISCLOSURE

The present disclosure relates to a gas dynamic pressure bearing, and a motor and a blower including the same.

2. BACKGROUND

A conventional gas dynamic pressure bearing includes a ring having a cylindrical outer peripheral surface region, and a housing having a tubular portion having an inner peripheral surface region facing the outer peripheral surface region. The outer peripheral surface region or the inner peripheral surface region is provided with a plurality of radial dynamic pressure grooves that act as a radial dynamic pressure bearing region between these two surface regions.

The gas dynamic pressure bearing has a configuration in which air is compressed to form a radial dynamic pressure bearing region. Since it is non-contact, it can cope with high rotation and has high noise reduction.

The conventional gas dynamic pressure bearing has a configuration in which air is compressed by a radial dynamic pressure groove. However, when the compression efficiency of the air in the radial dynamic pressure bearing region is low, the rotation of the ring may become unstable.

SUMMARY

A gas dynamic pressure bearing according to an example embodiment of the present disclosure includes a shaft centered on a central axis extending in an up-down direction, and a sleeve that faces at least a portion of the shaft in a radial direction. The portion in which the sleeve and the shaft face each other in the radial direction includes a first dynamic pressure portion located at each of both ends in the axial direction, and a second dynamic pressure portion located between the first dynamic pressure portions. In the first dynamic pressure portion, one of the sleeve and the shaft includes a plurality of dynamic pressure grooves arranged in a circumferential direction. A sum of center angles of groove widths of the dynamic pressure grooves in a cross-section cut along a plane orthogonal to the central axis is about 144° or more and about 216° or less.

The above and other elements, features, steps, characteristics and advantages of the present disclosure will become more apparent from the following detailed description of the example embodiments with reference to the attached drawings.

DETAILED DESCRIPTION

Figure 1:
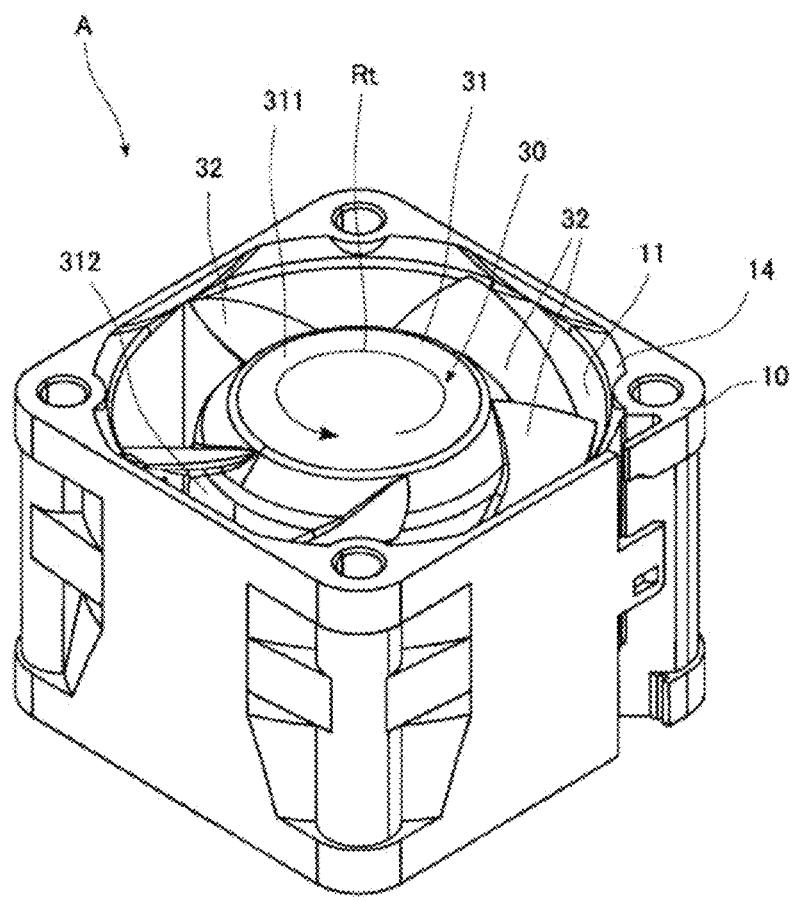
FIG. 1 is a perspective view of a blower.

Hereinafter, example embodiments of the present disclosure will be described in detail with reference to the drawings. In the present description, a blower A, a motor 20, and a gas dynamic pressure bearing 5 have the same central axis Cx. In the present description, a direction parallel to the central axis Cx of the blower A, the motor 20, and the gas dynamic pressure bearing 5 is referred to as an "axial direction", a direction orthogonal to the central axis Cx is referred to as a "radial direction", and a direction along an arc centered on the central axis Cx is referred to as a "circumferential direction". In the present description, the shape and the positional relationship of each part of the blower A will be described based on the premise that the axial direction is the up-down direction and an intake port 14 side of a housing 10 is an upper side with respect to the impeller 30. It should be noted, however, that the above definition of the up-down direction is made simply for the sake of convenience in description, and is not meant to restrict relative positions or directions of parts or portions of the blower A when in use.

Figure 2:
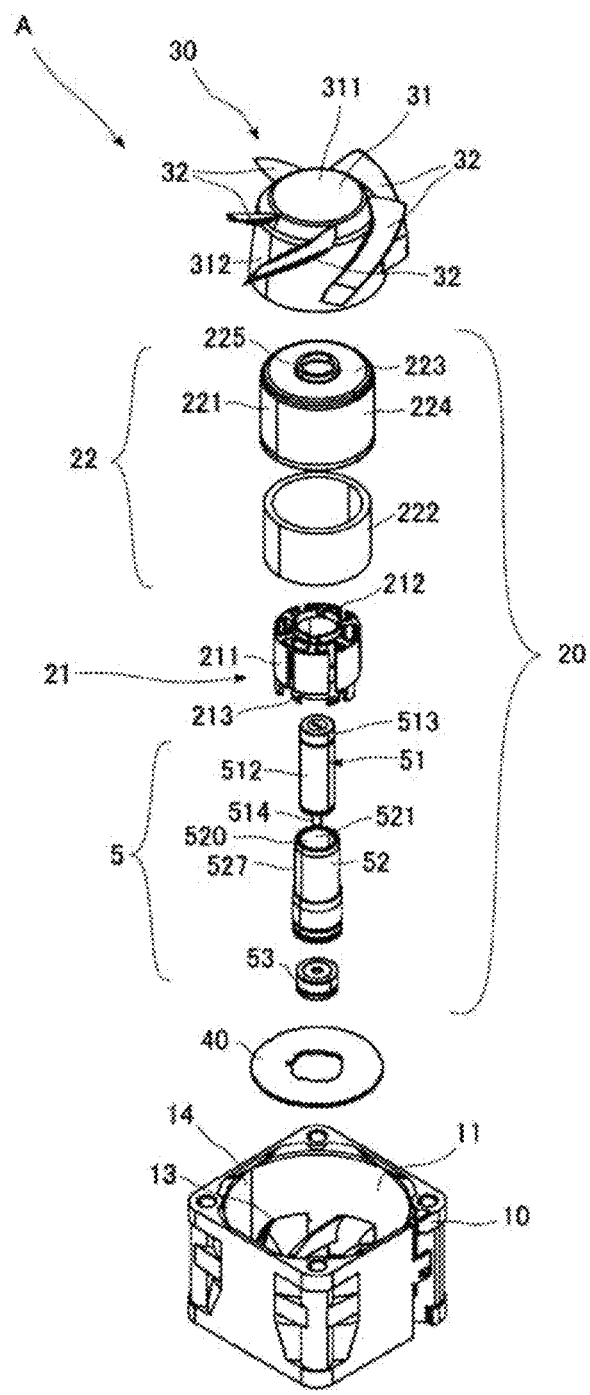
FIG. 2 is an exploded perspective view of the blower shown in FIG. 1.
Figure 3:
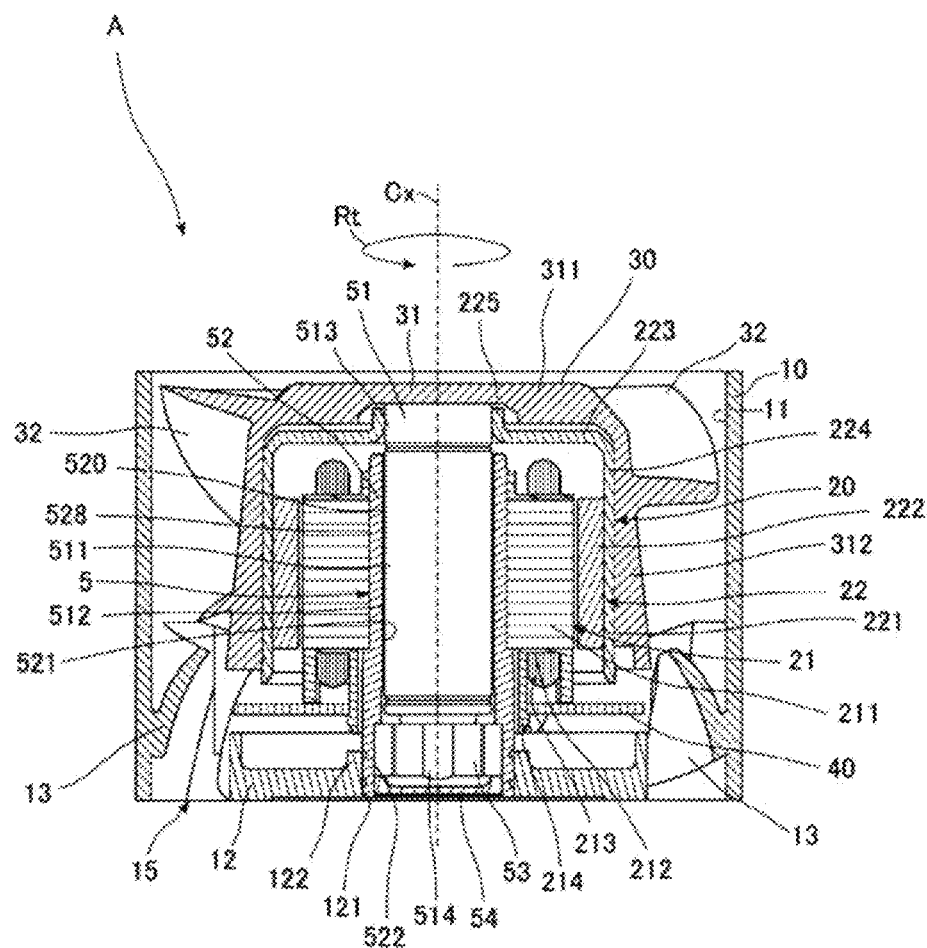
FIG. 3 is a longitudinal sectional view of the blower shown in FIG. 1.

A blower according to an example embodiment of the present disclosure will be described below. FIG. 1 is a perspective view of the blower A. FIG. 2 is an exploded perspective view of the blower A shown in FIG. 1. FIG. 3 is a longitudinal sectional view of the blower A shown in FIG. 1. As shown in FIGS. 1 to 3, the blower A includes the housing 10, the motor 20, the impeller 30, and a circuit board 40.

As shown in FIG. 3, in the blower A, the motor 20, the impeller 30, and the circuit board 40 are disposed inside the housing 10. The impeller 30 is attached to the motor 20. The rotation of the motor 20 causes the impeller 30 to rotate. The motor 20 to which the impeller 30 is mounted is mounted inside a wind tunnel 11, described below, of the housing 10. In the blower A, rotation of the motor 20 generates an airflow in the wind tunnel 11 from the upper side to the lower side in the axial direction. The airflow is ejected from an exhaust port 15 described later.

As shown in FIGS. 1 to 3, the housing 10 has the wind tunnel 11, a base 12, and a stationary blade 13. The wind tunnel 11 is a through-hole that connects the upper end and the lower end of the housing 10. The wind tunnel 11 has a cylindrical inner surface extending along the central axis Cx. The impeller 30 is disposed inside the wind tunnel 11. Rotation of the impeller 30 inside the wind tunnel 11 generates an airflow from the upper side to the lower side inside the wind tunnel 11. The wind tunnel 11 is a guide for guiding the airflow generated by the rotation of the impeller 30 along the central axis Cx. The upper end in the axial direction of the wind tunnel 11 is an intake port 14, and the lower end in the axial direction is the exhaust port 15. As the impeller 30 rotates, the air is sucked in from the intake port 14, and the airflow accelerated or pressurized by the impeller 30 is discharged from the exhaust port 15.

The base 12 is disposed at the lower end of the wind tunnel 11 in the axial direction, that is, at the downstream end of the wind tunnel 11 in the flow direction of the airflow. The base 12 is disposed inside the wind tunnel 11 in the radial direction. The base 12 has a base through hole 121 penetrating in the axial direction in a central portion (see FIG. 3), and has a cylindrical bearing holder 122 protruding axially upward from an edge portion of the base through hole 121. The bearing holder 122 is formed of the same member as the base 12, but is not limited to this. For example, the bearing holder 122 may be fixed to the base 12 by a fixing method such as welding, bonding, or screwing.

The wind tunnel 11 and the base 12 are arranged with a gap in the radial direction. In the gap between the wind tunnel 11 and the base 12, a plurality of stationary blades 13 are arranged in the circumferential direction. The stationary blade 13 connects the wind tunnel 11 and the base 12. In other words, the base 12 is held in the wind tunnel 11 via the stationary blade 13. The stationary blade 13 rectifies the airflow generated by the rotation of the impeller 30 into an axially symmetric flow about the central axis Cx. Therefore, the stationary blades 13 are arranged at equal intervals in the circumferential direction. The base 12 is formed integrally with the housing 10. Here, the housing 10 and the base 12 are formed by injection molding of a resin. However, the present disclosure is not limited to this, and the base 12 may be formed as a separate member from the housing 10.

As described above, the impeller 30 is rotatably disposed inside the wind tunnel 11 of the housing 10 in a state where the impeller 30 is attached to the motor 20. The impeller 30 is attached to a rotor 22, described below, of the motor 20. The rotation of the motor 20 causes the impeller 30 to rotate about the central axis. As shown in FIGS. 1 to 3, the impeller 30 has an impeller hub 31 and a plurality of blades 32. The impeller 30 is formed by injection molding of a resin.

As shown in FIGS. 2 and 3, the impeller hub 31 has a hub top plate 311 and a hub tubular portion 312. The hub top plate 311 has a disk shape that expands in the radial direction. The hub tubular portion 312 is in a tubular shape extending axially downward from a radially outer edge of the hub top plate 311.

A rotor yoke 221 of the rotor 22 of the motor 20, described below, is fixed inside the hub tubular portion 312. Thus, the impeller hub 31 and the rotor 22 are fixed.

The blades 32 are arranged on the outer surface of the impeller hub 31 in the circumferential direction. In the present example embodiment, the blades 32 are arranged at predetermined intervals in the circumferential direction on the outer surface of the impeller hub 31, and are integrally formed with the impeller hub 31. The upper part of the blade 32 is disposed forward of the lower part in the rotation direction Rt.

The impeller 30 is attached to the inside of the wind tunnel 11 of the housing 10 while being fixed to the motor 20. When the motor 20 is driven, the impeller 30 is rotated about the central axis Cx inside the wind tunnel 11.

The circuit board 40 is disposed inside the housing 10. The circuit board 40 is disposed below the motor 20 in the axial direction. The circuit board 40 is a disk having a through hole in the center. The circuit board 40 has a drive circuit for driving the motor 20. The circuit board 40 is held by a board holder 214 formed on an insulator 212 of the stator 21 of the motor 20 which will be described later.

Next, details of the motor 20 will be described. As shown in FIGS. 2 and 3, the motor 20 has the stator 21, the rotor 22, and the gas dynamic pressure bearing 5. The stator 21 and the rotor 22 are mounted on the base 12 of the housing 10 via the gas dynamic pressure bearing 5.

Figure 4:
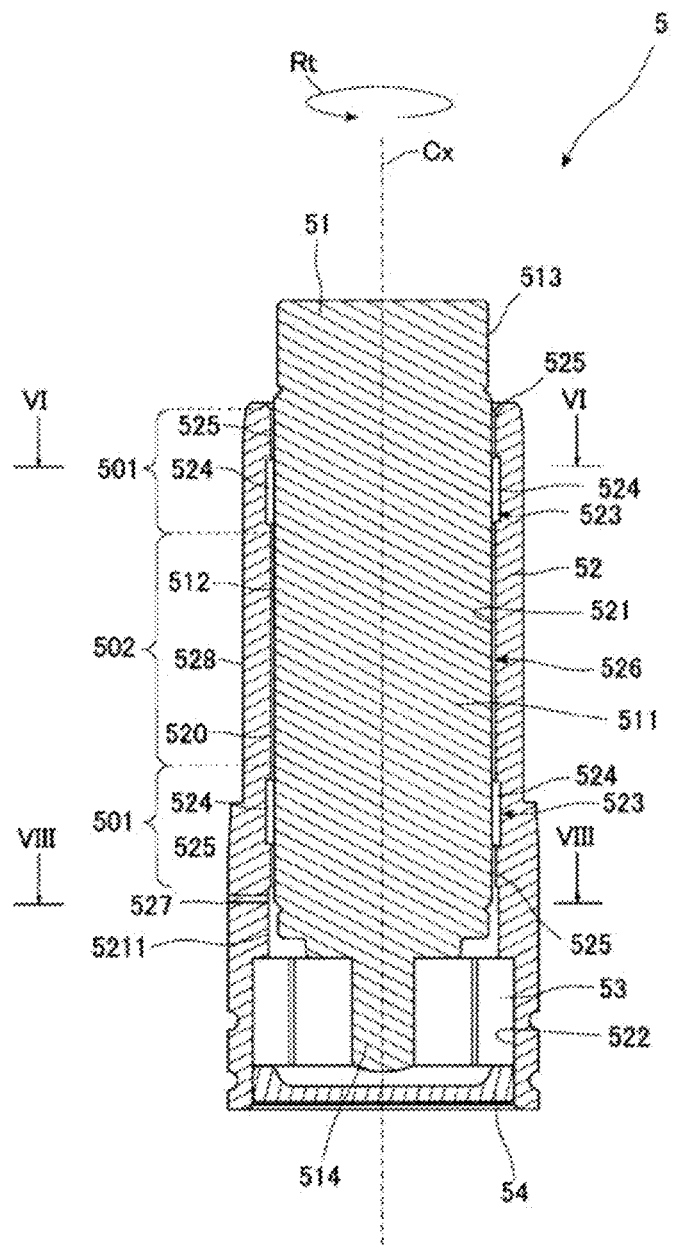
FIG. 4 is a longitudinal sectional view of a shaft and a sleeve constituting a gas dynamic pressure bearing.
Figure 5:
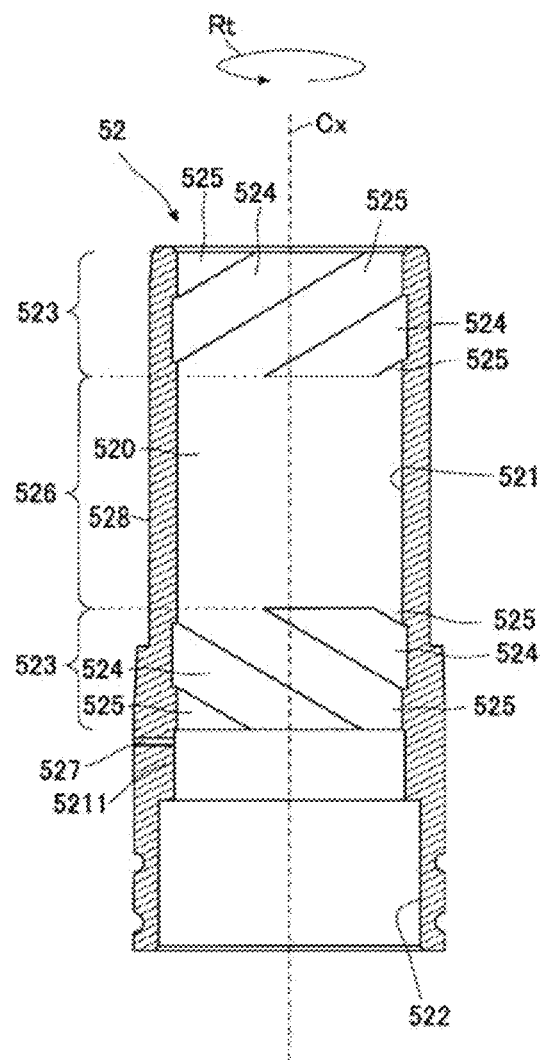
FIG. 5 is a vertical sectional view of the sleeve.
Figure 6:
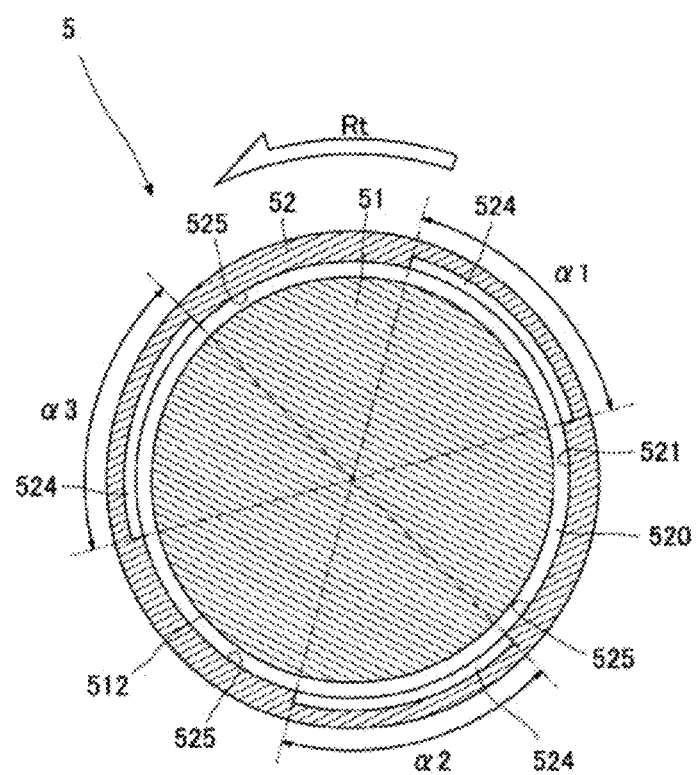
FIG. 6 is a sectional view of the gas dynamic pressure bearing shown in FIG. 4 cut along a plane including line VI-VI and orthogonal to a central axis.
Figure 7:
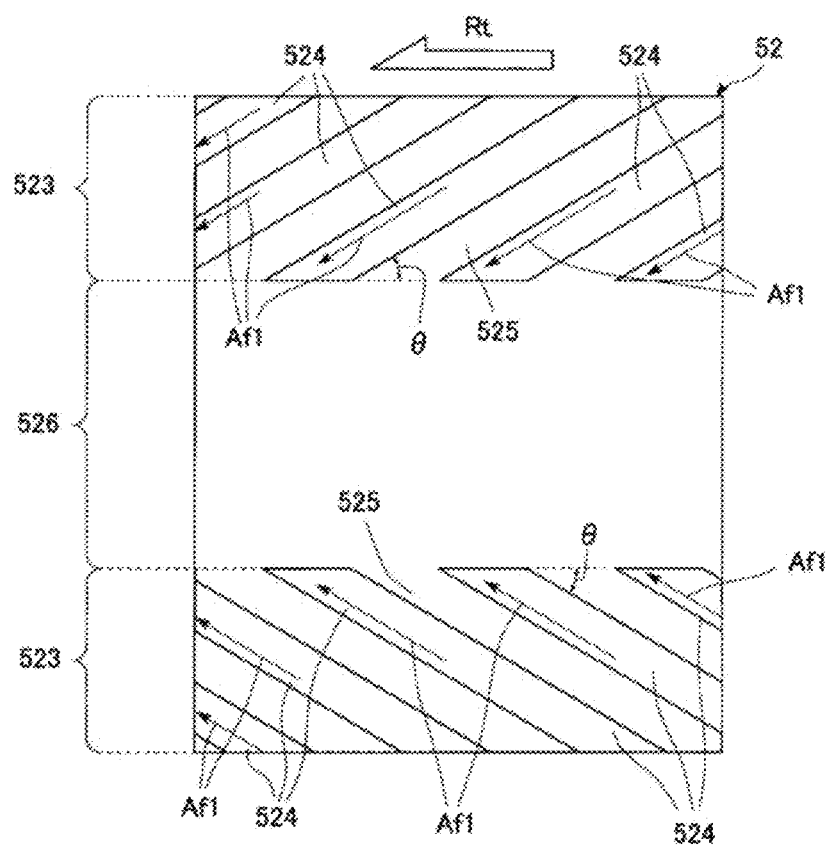
FIG. 7 is a development view in which an inner peripheral surface of the sleeve is developed in a circumferential direction.
Figure 8:
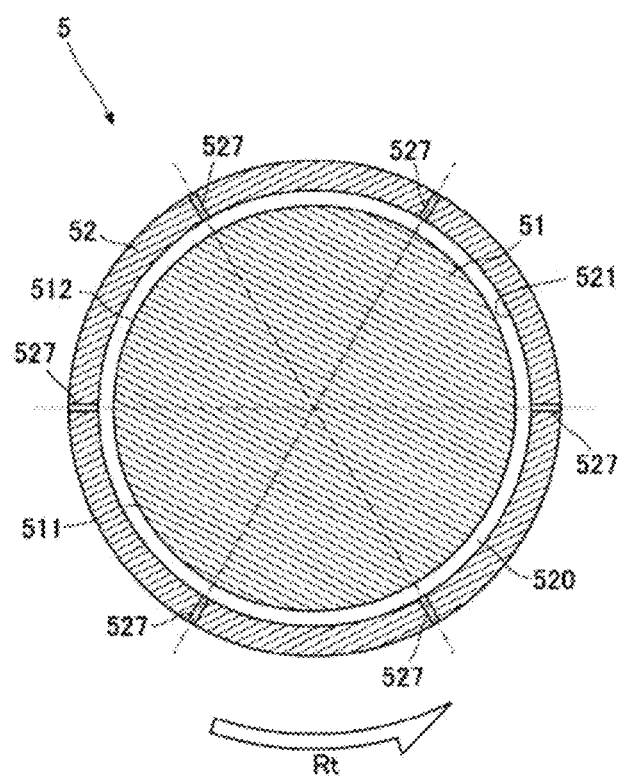
FIG. 8 is a sectional view of the gas dynamic pressure bearing illustrated in FIG. 4 cut along a plane including line VIII-VIII and orthogonal to a central axis.

FIG. 4 is a longitudinal sectional view of a shaft 51 and a sleeve 52 constituting the gas dynamic pressure bearing 5. FIG. 5 is a vertical sectional view of the sleeve 52. FIG. 6 is a sectional view of the gas dynamic pressure bearing 5 shown in FIG. 4 cut along a plane including VI-VI line and orthogonal to the central axis Cx. FIG. 7 is a development view of an inner peripheral surface 521 of the sleeve 52 developed in the circumferential direction. FIG. 8 is a sectional view of the gas dynamic pressure bearing 5 shown in FIG. 4 cut along a plane including line VIII-VIII and orthogonal to the central axis Cx.

As shown in FIGS. 2 to 6, the gas dynamic pressure bearing 5 includes the shaft 51, the sleeve 52, a thrust magnet 53, and a cap 54. As shown in FIGS. 3 and 4, the shaft 51 is rotatably disposed inside the sleeve 52. That is, the shaft 51 is centered on the central axis Cx extending in the up-down direction. The thrust magnet 53 is attached to the shaft 51 and the sleeve 52. By the thrust magnet 53, the shaft 51 is rotatable by the sleeve 52 and is supported at a fixed position in the axial direction (thrust direction). The cap 54 closes the opening at the lower end of the sleeve 52.

The shaft 51 and the sleeve 52 face each other with a gap in the radial direction. That is, the sleeve 52 radially faces at least a part of the shaft 51. The portion in which the shaft 51 and the sleeve 52 face each other in the radial direction is divided into a first dynamic pressure portion 501 and a second dynamic pressure portion 502 in the axial direction. The first dynamic pressure portions 501 are two regions in a radial gap between the shaft 51 and the sleeve 52, that is, an upper end portion and a lower end portion in the axial direction. The second dynamic pressure portion 502 is a region between the first dynamic pressure portions 501 in a radial gap between the shaft 51 and the sleeve 52. That is, the portion where the sleeve 52 and the shaft 51 radially face each other includes the first dynamic pressure portions 501 located at both ends in the axial direction, and the second dynamic pressure portion 502 located between the first dynamic pressure portions 501.

The second dynamic pressure portion 502 is disposed between the first dynamic pressure portions 501 continuously in the axial direction. In the first dynamic pressure portion 501 of the sleeve 52, a gas compression section 523 described later is formed. When the shaft 51 rotates, the first dynamic pressure portion 501 generates an airflow toward the center in the axial direction, that is, an airflow toward the second dynamic pressure portion 502. Thereby, the air pressure of the second dynamic pressure portion 502 increases. As will be described in detail later, the gas dynamic pressure bearing 5 supports the shaft 51 in a non-contact manner with respect to the sleeve 52 by increasing the pressure of the second dynamic pressure portion 502. Hereinafter, details of each part of the gas dynamic pressure bearing 5 will be described.

The shaft 51 extends along the central axis Cx. In the present example embodiment, the shaft 51 is a column member made of metal such as stainless steel. When the shaft 51 has a sufficient strength, the shaft 51 may not be made of metal. For example, ceramics or the like may be used. Furthermore, when it has sufficient strength, it may be a so-called hollow tubular member having a space inside. The sufficient strength of the shaft 51 includes, for example, a strength that is not easily deformed during rotation.

As shown in FIG. 4, the shaft 51 has a bearing portion 511, a rotor fixing portion 513, and a magnet fixing portion 514. On the shaft 51, the rotor fixing portion 513, the bearing portion 511, and the magnet fixing portion 514 are arranged in this order from above in the axial direction. The outer peripheral surface 512 of the bearing portion 511 has a columnar shape.

The rotor fixing portion 513 has a columnar shape, to which a shaft holder 225 of a rotor yoke 221, described later, of the rotor 22 is fixed. The fixing between the rotor fixing portion 513 and the shaft holder 225 is performed by press-fitting in the present example embodiment. However, the fixing between the rotor fixing portion 513 and the shaft holder 225 is not limited to press-fitting. Any method in which the center lines of the shaft 51 and the rotor 22 match and can be firmly fixed may be widely used. The magnet fixing portion 514 has a cylindrical shape, to which the inside of the thrust magnet 53 is fixed.

The shaft 51 is supported by the thrust magnet 53 in the axial direction (thrust direction). The thrust magnet 53 is divided into a radially inner side and an outer side. The inner side is fixed to the magnet fixing portion 514 of the shaft 51, and the outer side is held by the bearing magnet holder 522 of the sleeve 52. The thrust magnet 53 maintains the axial position of the shaft 51 with respect to the sleeve 52 at a certain position using attraction and repulsion of the magnet.

Note that a protection member (not shown) that covers at least the outer peripheral surface 512 of the bearing portion 511 may be disposed on the shaft 51.

As shown in FIGS. 4 and 5, the sleeve 52 has a tubular shape extending along the central axis Cx. The sleeve 52 is made of, for example, metal such as stainless steel. When the sleeve 52 has sufficient strength, for example, ceramic or the like may be used. The material forming the sleeve 52 is not limited to stainless steel or the like. Any material that can firmly hold the shaft 51 and the stator core 211 may be widely used.

As shown in FIG. 5, the sleeve 52 has a hole 520 extending along the central axis Cx. The hole 520 has openings at both ends in the axial direction. Inside the hole 520, the shaft 51 is rotatably arranged.

The hole 520 of the sleeve 52 has a bearing magnet holder 522, a gas compression section 523, and an inner cylindrical portion 526. The bearing magnet holder 522 is arranged at the lower end of the hole 520 in the axial direction. The bearing magnet holder 522 holds the radially outer surface of the thrust magnet 53. A cap 54 is attached to the lower end of the hole 520 of the sleeve 52. The cap 54 is fixed to the hole 520 of the sleeve 52, and suppresses a foreign material from entering the inside of the sleeve 52 from the outside of the sleeve 52.

As described above, the gas compression section 523 is formed in a portion of the inner peripheral surface 521 of the hole 520 that constitutes the first dynamic pressure portion 501. The inner cylindrical portion 526 is formed in a portion of the inner peripheral surface 521 of the hole 520 that constitutes the second dynamic pressure portion 502.

The inner cylindrical portion 526 is a cylindrical shape having a constant inner diameter over the entire axial length. Here, the term "constant" includes not only a case where it is accurately constant, but also a case where there is a variation to such an extent that the rotation of the shaft 51 does not become unstable due to a change in atmospheric pressure.

A plurality of (for example, three) dynamic pressure grooves 524 are arranged in the gas compression section 523 formed in the first dynamic pressure portion 501 of the sleeve 52. That is, in the first dynamic pressure portion 501, one of the sleeve 52 and the shaft 51 has a plurality of dynamic pressure grooves 524 arranged in the circumferential direction. The dynamic pressure groove 524 is radially recessed from the inner peripheral surface 521 of the hole 520 and extends in the axial direction and the circumferential direction. The dynamic pressure groove 524 has a spiral shape in which the second dynamic pressure portion 502 side is located on the front side in the rotation direction of the shaft 51. That is, as shown in FIG. 7, the dynamic pressure groove 524 extends forward in the rotation direction Rt of the shaft 51 toward the second dynamic pressure portion 502 of the sleeve 52.

An angle at which the dynamic pressure groove 524 intersects a tangent of a cut shape obtained by cutting the inner peripheral surface 521 of the sleeve 52 of the dynamic pressure groove 524 along a plane orthogonal to the central axis Cx is assumed to be an angle θ. That is, the dynamic pressure groove 524 is provided on the inner peripheral surface 521 of the sleeve 52. The dynamic pressure groove 524 extends forward in the rotation direction Rt of the shaft 51 toward the second dynamic pressure portion 502. The dynamic pressure groove 524 can be easily formed on the inner peripheral surface 521 of the sleeve 52 by etching or the like. Further, it is possible to easily form a protection member on the outer peripheral surface 512 of the bearing portion 511 of the shaft 51.

As illustrated in FIGS. 5 and 7, the angle θ of the dynamic pressure groove 524 disposed on the upper first dynamic pressure portion 501 and the angle θ of the dynamic pressure groove 524 disposed on the lower first dynamic pressure portion 501 are the same angle but have different directions. That is, the angle between the dynamic pressure groove 524 of one first dynamic pressure portion 501 and the surface orthogonal to the central axis Cx is the same as the angle between the dynamic pressure groove 524 of the other first dynamic pressure portion 501 and the surface orthogonal to the central axis Cx. Thereby, the pressure between the shaft 51 and the sleeve 52 tends to be vertically symmetrical, and the shaft 51 can be supported rotatably and stably.

Further, as shown in FIG. 6, when the circumferential angles of the three dynamic pressure grooves 524 (center angles of the groove widths of the dynamic pressure grooves 524) are assumed to be α1, α2, and α3, in the sleeve 52 of the present example embodiment, α1=α2=α3. That is, the circumferential width of the dynamic pressure groove 524 is uniform. Here, the term "uniform" includes not only a case in which it is strictly uniform but also a case in which there are some variations.

In the gas dynamic pressure bearing 5, when the shaft 51 rotates inside the sleeve 52, an airflow that flows in the rotation direction of the shaft 51 is generated in the gap between the shaft 51 and the sleeve 52. In the first dynamic pressure portion 501, the airflow generated by the rotation of the shaft 51 flows into the dynamic pressure groove 524. The airflow that has flowed into the dynamic pressure groove 524 flows toward the second dynamic pressure portion 502 along the dynamic pressure groove 524 as a first airflow Af1.

In the gas compression section 523, three dynamic pressure grooves 524 are arranged side by side in the circumferential direction. A land portion 525 is formed in a portion between the circumferentially adjacent dynamic pressure grooves 524. The land portion 525 is a cylindrical portion having the same inner diameter as the inner cylindrical portion 526. Here, the term "identical" includes a case where the values are exactly the same, and also includes a case where there are some variations to such an extent that the rotation of the shaft 51 does not become unstable due to a change in the atmospheric pressure. The configurations of the gas compression section 523 and the dynamic pressure groove 524 are not limited to the above-described configurations. Any shapes capable of sending gas into the second dynamic pressure portion 502 by rotation of the shaft 51 can be widely used.

The sleeve 52 has a vent 527 and a stator fixing portion 528. The sleeve 52 has a sleeve extension 5211 that extends toward the axial end from the lower first dynamic pressure portion 501. The vent 527 is provided in the sleeve extension 5211. The vent 527 is a through hole that penetrates the hole 520 from the outside of the sleeve 52. In the present example embodiment, the vent 527 extends in the radial direction. The vent 527 is formed below the sleeve 52 in the axial direction. That is, the sleeve 52 has the sleeve extension 5211 extending to the axial end side beyond the first dynamic pressure portion 501, and the sleeve extension 5211 has the vent 527 that connects the radially outer side and the inner side of the sleeve 52 so that the sleeve 52 can be ventilated.

In the gas dynamic pressure bearing 5, the rotation of the shaft 51 generates the first airflow Af1 having an axially downward velocity component in the upper first dynamic pressure portion 501, and generates the first airflow Af1 having an axially upward velocity component in the lower first dynamic pressure portion 501. Since the hole 520 of the sleeve 52 has an opening at the upper end, an external gas (air) is taken in from the opening when the upper first dynamic pressure portion 501 sends the first airflow Af1 to the second dynamic pressure portion 502. On the other hand, the opening at the lower end of the hole 520 is closed by the cap 54. Therefore, external gas is not taken in from the opening. Therefore, in the sleeve 52, a vent 527 is provided, and when the first airflow Af1 is sent from the lower first dynamic pressure portion 501 to the second dynamic pressure portion 502, the gas is taken into the hole 520 via the vent 527.

By providing the vent 527, the gas is also taken into the lower first dynamic pressure portion 501, so that variation of the pressure of the gas sent to the second dynamic pressure portion 502 can be suppressed. The vent 527 is arranged at a position where it is not blocked by the stator 21 or the like. As shown in FIG. 8, in the sleeve 52 of the present example embodiment, six vents 527 are provided and are arranged at equal intervals in the circumferential direction. With the arrangement of the vents 527, it is possible to increase the amount of inflow of the air and suppress variations in the air pressure between the shaft 51 and the sleeve 52 in the circumferential direction. Further, by providing the vents 527, the pressure below the lower first dynamic pressure portion 501 in the axial direction can be made equal to the pressure above the upper first dynamic pressure portion 501 in the axial direction. Thereby, the pressure in the sleeve 52 is stabilized.

In addition, in this example embodiment, although six vents 527 are provided, it is not limited thereto. It is possible to widely adopt any number and arrangement of the vents 527 if sufficient gas can be made to flow and the pressure is unlikely to fluctuate. In the present example embodiment, the sleeve extension 5211 and the vents 527 are arranged closer to the axial end side than the lower first dynamic pressure portion 501, but the present disclosure is not limited thereto. The sleeve extension 5211 and the vents 527 may be disposed closer to the axial end than the upper first dynamic pressure portion 501. Further, they may be arranged closer to the axial end than the two first dynamic pressure portions 501. The sleeve extension 5211 and the vent 527 are preferably provided at positions where the pressure of the gas in the sleeve 52 can be stabilized. When the pressure of the gas in the sleeve 52 is stabilized, the vent 527 may be omitted.

The stator fixing portion 528 is formed on the outer surface of the sleeve 52. As shown in FIG. 3, a stator core 211 of the stator 21, described below, is fixed to the stator fixing portion 528. Fixing of the stator core 211 can be performed by, for example, press-fitting. However, fixing of the stator core 211 is not limited to press-fitting, and any fixing methods for fixing the stator core 211 to the sleeve 52, such as bonding, welding, and screwing, can be widely employed. Note that a force when the stator core 211 is pressed into the stator fixing portion 528 acts on the stator fixing portion 528. In order to suppress deformation of the stator fixing portion 528, that is, the sleeve 52, due to the force at the time of press-fitting the stator core 211, the sleeve 52 preferably has a certain thickness in the radial direction. As the thickness of the sleeve 52, for example, the outer diameter of the stator fixing portion 528 can be 1.2 times or more the inner diameter of the hole 520. That is, the outer diameter of the sleeve 52 is at least 1.2 times the inner diameter of the sleeve 52.

As illustrated in FIG. 3, the stator 21 includes a stator core 211, an insulator 212, and a coil 213.

The stator core 211 has a cylindrical core back portion (not shown) and teeth (not shown) protruding radially outward from the outer peripheral surface of the core back portion. The stator core 211 may have a structure in which electromagnetic steel sheets are laminated, or may be a single member formed by power firing or casting. The stator core 211 has a core back portion fixed to the stator fixing portion 528 of the sleeve 52.

The insulator 212 is a resin molded body. The insulator 212 covers at least a portion of the stator core 211. The insulator 212 covers the teeth, and a coil 213 is formed by winding a conductive wire around the teeth covered by the insulator 212. The insulator 212 provides isolation between the stator core 211 and each coil 213. In the present example embodiment, the insulator 212 is a resin molded body, but is not limited to this. Any configuration that can insulate the stator core 211 and the coil 213 can be widely adopted.

The insulator 212 has a board holder 214. The board holder 214 extends downward from the lower surface in the axial direction of the insulator 212. The board holder 214 penetrates a through hole formed in the center of the circuit board 40 and holds the circuit board 40.

The sleeve 52 of the gas dynamic pressure bearing 5 is held by a bearing holder 122 of the base 12. As described above, since the stator core 211 is fixed to the sleeve 52, the stator core 211 is fixed to the base 12 via the sleeve 52 of the gas dynamic pressure bearing 5. That is, the stator 21 is attached to the sleeve 52 of the gas dynamic pressure bearing 5 and fixed to the housing 10. At this time, the center of the stator core 211 coincides with the central axis Cx (see FIG. 3).

As shown in FIGS. 2 and 3, the rotor 22 has a rotor yoke 221 and a rotor magnet 222. The rotor yoke 221 has a rotor top plate 223, a rotor cylindrical portion 224, and a shaft holder 225. The rotor yoke 221 is formed of a magnetic metal. The rotor yoke 221 is formed by, for example, extruding a metal plate. The method of forming the rotor yoke 221 is not limited to extrusion of a metal plate.

The rotor top plate 223 is annular, and has a through hole at the center. The rotor cylindrical portion 224 extends axially below the radially outer edge of the rotor top plate 223. The rotor cylindrical portion 224 is in a cylindrical shape. The shaft holder 225 has a cylindrical shape that protrudes radially upward an edge portion of the through hole. The shaft holder 225 is formed on the opposite side of the rotor cylindrical portion 224 with respect to the rotor top plate 223 in the axial direction, but is not limited to this. It may be formed on the same side.

The shaft 51 passes through a through hole formed in the center of the rotor top plate 223. The shaft holder 225 holds the rotor fixing portion 513 at the upper end of the shaft 51 in the axial direction. The shaft holder 225 and the rotor fixing portion 513 are fixed by press-fitting. As a result, the center of the rotor yoke 221 coincides with the central axis Cx. Fixing between the shaft holder 225 and the rotor fixing portion 513 is not limited to press-fitting, and any method that can fix them firmly, such as bonding or welding, can be widely used.

The rotor magnet 222 has a columnar shape. The rotor magnet 222 faces the stator 21 in the radial direction. The rotor magnet 222 has a configuration in which N poles and S poles are alternately arranged in the circumferential direction. The rotor magnet 222 may be formed using a magnet that can be divided in the circumferential direction, or may be formed by alternately forming different magnetic poles in the circumferential direction on a cylindrical body formed of a single member.

The rotor magnet 222 is fixed to the inner surface of the rotor yoke 221. The rotor yoke 221 to which the rotor magnet 222 is fixed is fixed to the rotor fixing portion 513 of the shaft 51. Then, since the shaft 51 is rotatably supported by the sleeve 52, the rotor magnet 222 faces the stator core 211 in the radial direction. When an electric current flows through the coil 213, a magnetic force (attraction and repulsion) generated between the stator core 211 and the rotor magnet 222 causes a rotational force to act on the rotor 22.

The blower A and the motor 20 have the configurations described above. That is, the motor 20 includes the gas dynamic pressure bearing 5, the stator 21 arranged on the outer surface of the sleeve 52, and the rotor 22 fixed to the upper end of the shaft 51 and radially facing the stator 21. The blower A includes the impeller 30 attached to the rotor 22 of the motor 20.

Here, the operation of the gas dynamic pressure bearing 5 will be described. In the gas dynamic pressure bearing 5, the shaft 51 rotates in the rotation direction Rt inside the sleeve 52. As shown in FIGS. 1, 3, 6, and elsewhere, the rotation direction Rt of the shaft 51 is a counterclockwise direction when viewed from above in the axial direction.

When the shaft 51 rotates, an airflow is generated on the outer surface of the shaft 51. The airflow generated on the outer surface of the shaft 51 is in the same direction as the rotation direction Rt of the shaft 51. The gas dynamic pressure bearing 5 has the gas compression section 523 in each of the upper and lower first dynamic pressure portions 501 in the axial direction. In the first dynamic pressure portion 501, the airflow generated on the outer surface of the shaft 51 flows into the dynamic pressure groove 524 of the gas compression section 523, and flows along the dynamic pressure groove 524 in the rotation direction Rt of the shaft 51 as the first airflow Af1. The dynamic pressure groove 524 extends toward the second dynamic pressure portion 502 at the front in the rotation direction Rt of the shaft 51. Therefore, the first airflow Af1 flows along the dynamic pressure groove 524 and flows into the second dynamic pressure portion 502. That is, the dynamic pressure groove 524 axially sends the airflow in the circumferential direction generated in the first dynamic pressure portion 501, to the second dynamic pressure portion 502.

The airflow generated by the rotation of the shaft 51 forcibly flows from the first dynamic pressure portion 501 to the second dynamic pressure portion 502 as the first airflow Af1. When the first airflow Af1 is forcibly introduced, the pressure of the gas (air) in the second dynamic pressure portion 502 increases. Due to the gas pressure in the second dynamic pressure portion 502, the shaft 51 rotates while being separated (floating) from the sleeve 52. That is, in the gas dynamic pressure bearing 5, the pressure of the second dynamic pressure portion 502 is increased by sending gas (air) toward the second dynamic pressure portion 502 by the first dynamic pressure portion 501, and in the second dynamic pressure portion 502, the shaft 51 is rotatably supported in a non-contact state.

The motor 20 includes the gas dynamic pressure bearing 5 described above, and the motor 20 can rotate stably and smoothly. Since the shaft 51 is rotatably supported by the sleeve 52 stably, the rotation of the motor 20 causes the impeller 30 to rotate stably. Thereby, an airflow can be generated stably in the wind tunnel 11, and the blower A can discharge a stable airflow from the exhaust port 15.

As described above, in the gas dynamic pressure bearing 5, the shaft 51 is rotatably supported in a non-contact state by the gas pressure in the second dynamic pressure portion 502. Therefore, when the gas pressure in the second dynamic pressure portion 502 is low, the shaft 51 may come into contact with the sleeve 52. Therefore, the pressure of the gas in the second dynamic pressure portion 502 is preferably high.

In the gas dynamic pressure bearing 5, the pressure of the gas in the second dynamic pressure portion 502 varies depending on the shape of the dynamic pressure groove 524. In the gas dynamic pressure bearing 5, by appropriately setting the shape of the dynamic pressure groove 524, the shaft 51 can be supported more stably and rotatably.

As described above, the airflow generated by the rotation of the shaft 51 flows along the dynamic pressure groove 524 inside the dynamic pressure groove 524 as the first airflow Af1. By increasing the flow rate of the first airflow Af1, a larger amount of gas can be sent to the second dynamic pressure portion 502, and the pressure of the gas in the second dynamic pressure portion 502 can be increased.

Therefore, as the shape of the dynamic pressure groove 524, attention was paid to the circumferential width of the dynamic pressure groove 524 (circumferential angles α1, α2, α3: FIG. 6) and the angle θ (FIG. 7) of the dynamic pressure groove 524 intersecting a tangent of a cut shape cut along a plane orthogonal to the central axis Cx of the dynamic pressure groove 524. Then, the optimized shape of the dynamic pressure groove 524 was obtained by numerical simulation.

The shaft 51 had a cylindrical shape with an outer diameter of approximately 7 mm and a length of 22 mm. The sleeve 52 of the gas dynamic pressure bearing 5 had a cylindrical shape with an outer diameter of 9 mm and an axial length of 15.7 mm, and the inner diameter was made approximately 3 μm larger than the outer diameter of the shaft. On the inner peripheral surface 521 of the hole 520 of the sleeve 52, a gas compression section 523 having a length of 4.6 mm was formed from both ends in the axial direction, and a dynamic pressure groove 524 recessed in the radial direction was formed in the gas compression portion 523.

In the gas compression section 523, three dynamic pressure grooves 524 were formed at equal intervals in the circumferential direction. The center angles of the groove widths of the dynamic pressure grooves 524 in a cross-section obtained by cutting the gas compression section 523 along a plane orthogonal to the central axis Cx, are $\alpha 1$, $\alpha 2$, and $\alpha 3$, respectively, where $\alpha 1 = \alpha 2 = \alpha 3$. In this simulation, $\alpha = \alpha 1 + \alpha 2 + \alpha 3$ is established. "$\alpha$" represents the sum of the center angles of the groove widths of the dynamic pressure grooves 524 in a cross-section cut along a plane orthogonal to the central axis Cx.

The ambient gas was air, the temperature was 22° C., the ambient pressure in a state where the gas dynamic pressure bearing 5 was stopped was 1 atmospheric pressure (101 kPa), and the shaft 51 was rotated at 34000 rpm. Then, a plurality of times of simulations were performed for each model, maximum values of the gas pressure in the second dynamic pressure portion 502 at each simulation was obtained, and the appropriate shape of the dynamic pressure groove 524 was examined using the sum average of the maximum values.

In the first simulation, the size of the dynamic pressure groove 524 was examined. The simulation was performed using simulation models in which the angle θ was 32° and the sum a of the center angles was changed to 72°, 108°, 144°, 180°, 216°, and 252°, respectively. For ease of explanation, the simulation models of $\alpha = 72°$, 108°, 144°, 180°, 216°, and 252° are assumed to be S11, S12, S13, S14, S15, and S16, respectively.

Figure 9:
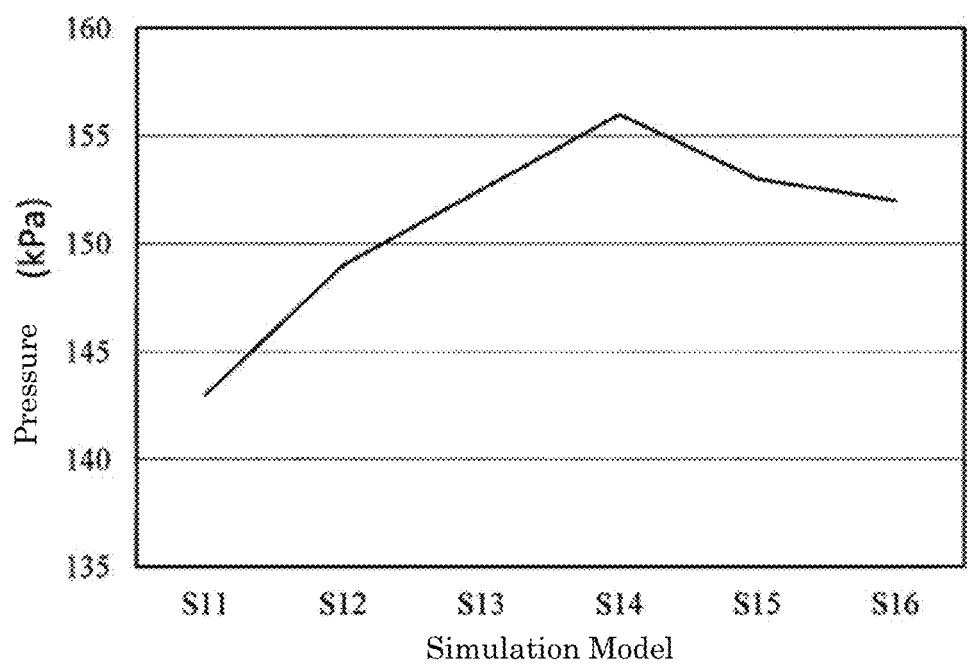
FIG. 9 is a graph showing results of a first simulation.

The simulation results are shown in FIG. 9. FIG. 9 is a graph showing the results of the first simulation. In FIG. 9, the vertical axis represents the average (unit: kPa) of the maximum values of the pressure in the second dynamic pressure portion 502, and the horizontal axis represents the simulation models.

As shown in FIG. 9, in the simulation model S11, the average of the maximum values of the pressure in the second dynamic pressure portion 502 was about 143 kPa. As the sum a of the center angles increases in the simulations performed for the simulation model S12, the simulation model S13, and the simulation model S14, the average of the maximum values of the pressure in the second dynamic pressure portion 502 increases. In the simulation model S14, the average of the maximum values of the pressure in the second dynamic pressure portion 502 was about 156 kPa. Then, as the sum a of the center angles increases in the simulations performed for the simulation model S15 and the simulation model S16, the average of the maximum values of the pressure in the second dynamic pressure portion 502 decreases.

In the gas dynamic pressure bearing 5, the pressure is preferably 150 kPa or more in order to rotatably support the shaft 51 smoothly and stably. It was found that the sum a of the center angles of the dynamic pressure grooves 524 on a cross-section cut along a plane orthogonal to the central axis is preferably 144° or more and 216° or less. That is, the total of the center angles of the dynamic pressure grooves 524 on the cross-section cut along a plane orthogonal to the central axis Cx is 144° or more and 216° or less. In addition, even in the simulation model S16 in which the sum a of the center angles of the groove widths of the dynamic pressure grooves 524 in the cross-section cut along a plane orthogonal to the center axis is 252°, the average value also exceeds 150 kPa. However, since the value varied greatly every time the simulation is performed, the values were excluded from appropriate values.

In the present example embodiment, the sum of the center angles of the groove widths of the dynamic pressure grooves 524 is used. However, as shown in FIG. 7, a ratio of occupied areas of the regions in which dynamic pressure grooves 524 are formed on the inner peripheral surface of the gas compression section 523 may be used. The area occupied by the dynamic pressure groove 524 forming area on the inner peripheral surface of the gas compression section 523 is preferably 40% or more and 60% or less.

By setting the sum of the center angles of the groove widths of the dynamic pressure grooves 524 ($\alpha 1 + \alpha 2 + \alpha 3$ in FIG. 6) to 144° or more and 216° or less, the gas pressure in the second dynamic pressure portion 502 can be kept high. Thus, the radial load of the shaft 51 can be efficiently supported, and the shaft 51 can be rotatably supported in a non-contact state.

In the second simulation, the angle θ of the dynamic pressure groove 524 intersecting a tangent of a cut shape cut along a plane orthogonal to the central axis Cx of the dynamic pressure groove 524 was examined. Simulations were performed on simulation models in which the total angle α was set to approximately 180° and the angle θ intersecting a tangent of a cut shape cut along a plane orthogonal to the central axis was changed to 22°, 27°, 32°, 37°, 42°, and 47°. For ease of explanation, simulation models at θ=22°, 27°, 32°, 37°, 42°, and 47° are assumed to be S21, S22, S23, S24, S25, and S26, respectively.

Figure 10:
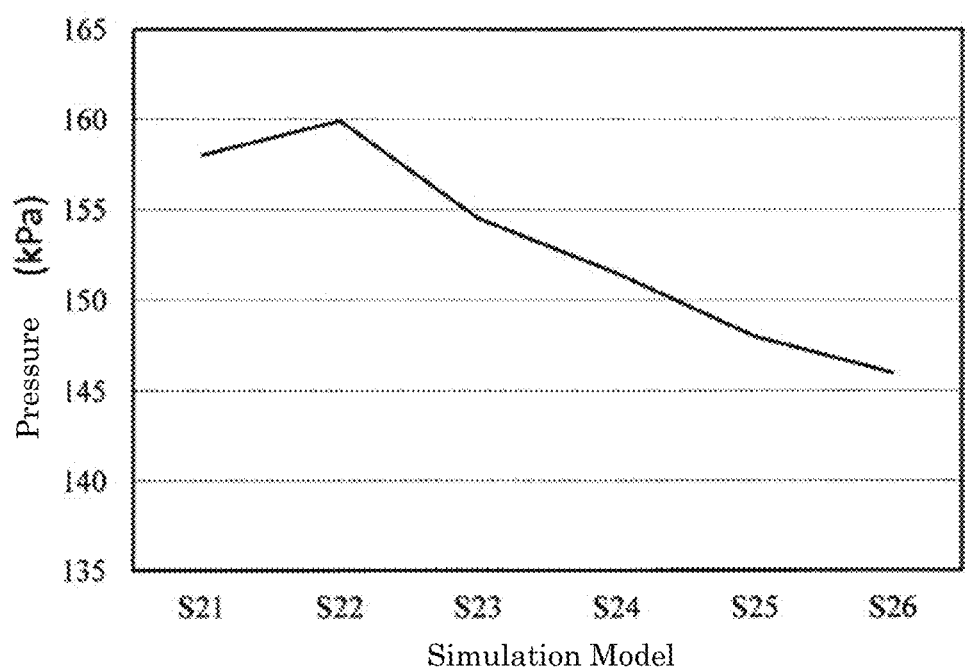
FIG. 10 is a graph showing results of a second simulation.

The simulation results are shown in FIG. 10. FIG. 10 is a graph showing the results of the second simulation. As shown in FIG. 10, in the simulation model S21, the average of the maximum values of the pressure in the second dynamic pressure portion 502 was about 158 kPa. In the simulation model S22, the average of the maximum values of the pressure in the second dynamic pressure portion 502 was about 160 kPa. In the simulation model S23 and thereafter, the average of the maximum values of the pressure in the second dynamic pressure portion 502 decreases.

In the gas dynamic pressure bearing 5, the pressure is preferably 150 kPa or more in order to rotatably support the shaft 51 smoothly and stably. It is found that the angle θ of the dynamic pressure groove 524 intersecting the tangent of the cut shape cut along a plane orthogonal to the central axis of the dynamic pressure groove 524 is preferably 27° or more and 37° or less. That is, the dynamic pressure groove 524 extends in a direction intersecting a cross-section cut along a plane orthogonal to the central axis Cx at an angle of 27 degrees or more and 37 degrees or less. Although the simulation model S21 in which the angle θ of the dynamic pressure groove 524 intersecting the tangent of the cut shape cut along a plane orthogonal to the central axis of the dynamic pressure groove 524 is 22° also exceeds 150 kPa on average, since the value largely varied, they were excluded from appropriate values here. Thereby, the pressure of the gas in the second dynamic pressure portion 502 can be efficiently increased.

Figure 11:
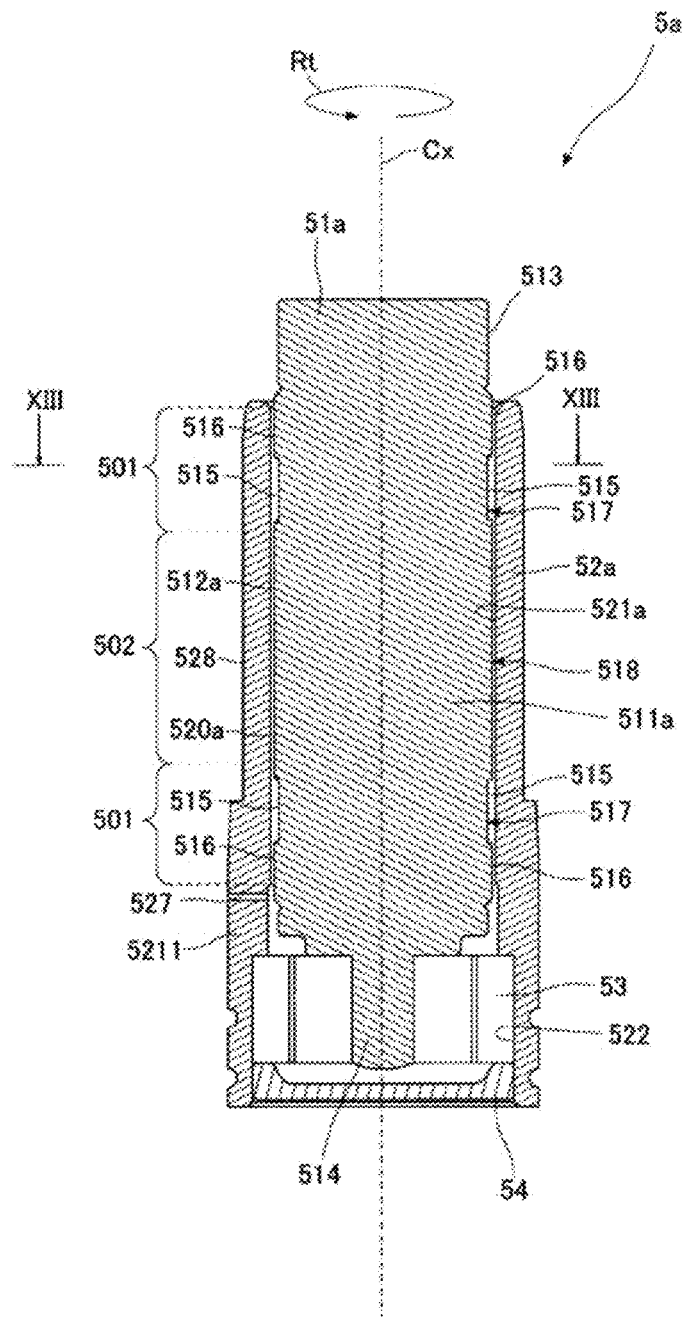
FIG. 11 is a longitudinal sectional view of a shaft and a sleeve constituting a gas dynamic pressure bearing.
Figure 12:
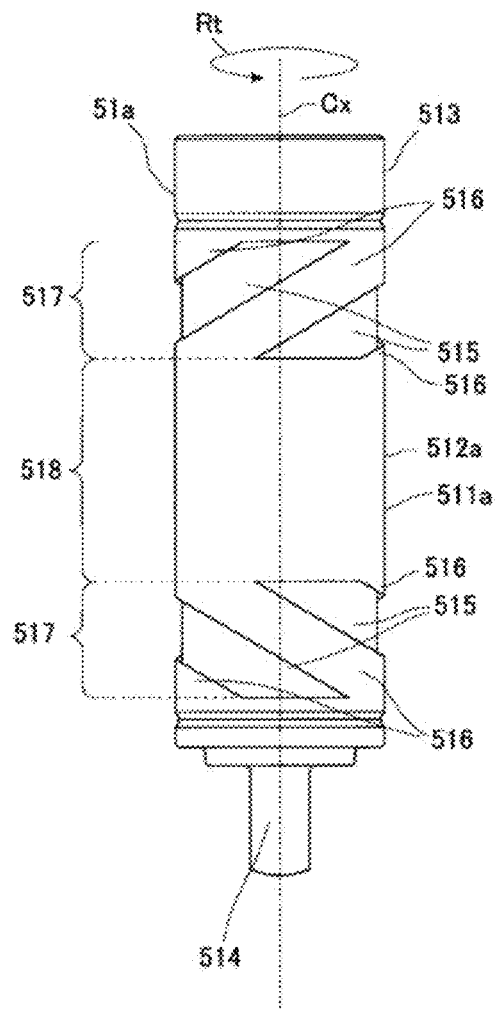
FIG. 12 is a vertical sectional view of the sleeve.
Figure 13:
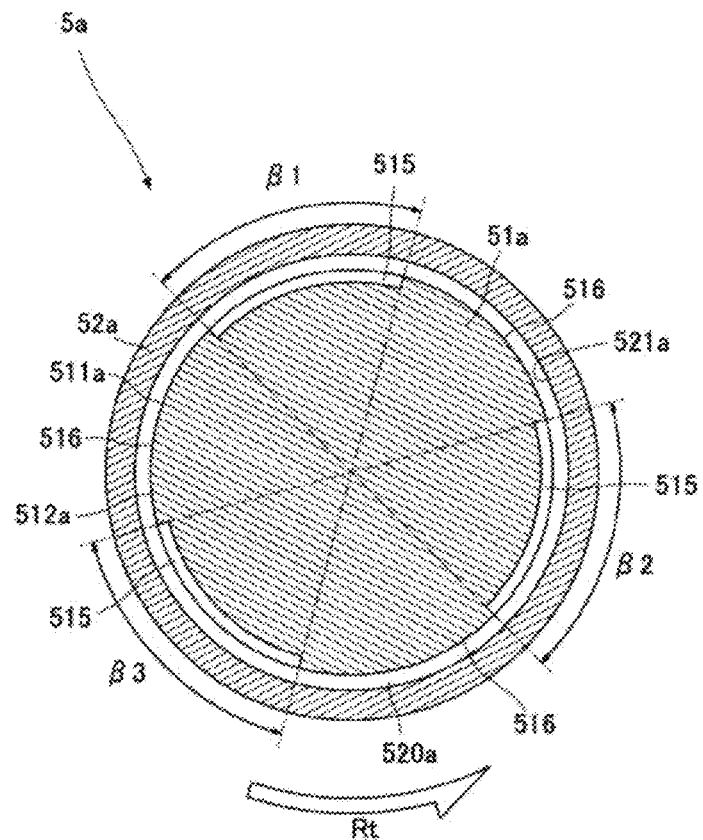
FIG. 13 is a sectional view of the gas dynamic pressure bearing shown in FIG. 11 cut along a plane including line XIII-XIII and orthogonal to a central axis Cx.
Figure 14:
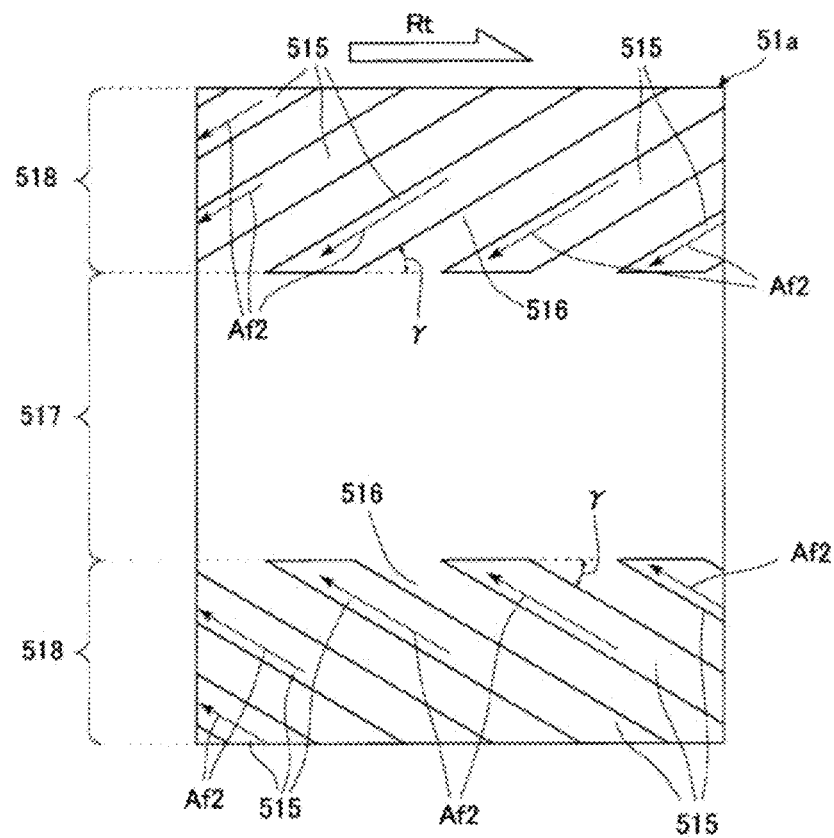
FIG. 14 is a development view of an inner peripheral surface of the sleeve developed in a circumferential direction.

A first modification of the present example embodiment will be described with reference to the drawings. FIG. 11 is a longitudinal sectional view of a shaft 51a and a sleeve 52a that constitute a gas dynamic pressure bearing 5a. FIG. 12 is a vertical sectional view of the sleeve 52a. FIG. 13 is a sectional view of the gas dynamic pressure bearing 5a shown in FIG. 11 taken along a plane including line XIII-XIII and orthogonal to the central axis Cx. FIG. 14 is a development view of the inner peripheral surface 521a of the sleeve 52a developed in the circumferential direction. The gas dynamic pressure bearing 5a differs from the gas dynamic pressure bearing 5 in that a dynamic pressure groove 515 is formed in the shaft 51a. In the gas dynamic pressure bearing 5a, the parts other than the shaft 51a and the sleeve 52a have the same configuration as the gas dynamic pressure bearing 5. Therefore, in the gas dynamic pressure bearing 5a, the same parts as those of the gas dynamic pressure bearing 5 are denoted by the same reference numerals, and the detailed description of the same parts is omitted.

As shown in FIGS. 11 and 13, the gas dynamic pressure bearing 5a has the shaft 51a and the sleeve 52a. The sleeve 52a is in a cylindrical shape. The sleeve 52a has an inner peripheral surface 521a of a hole 520a. The inner peripheral surface 521a is a cylindrical curved surface.

A bearing portion 511a radially facing the inner peripheral surface 521a of the shaft 51a has a gas compression section 517 and an outer cylinder portion 518. The gas compression section 517 is formed on a portion constituting the first dynamic pressure portion 501 on the outer peripheral surface 512a of the bearing portion 511a. The outer cylindrical portion 518 is formed in a portion that forms the second dynamic pressure portion 502 of the bearing portion 511a.

The outer cylindrical portion 518 is in a cylindrical shape having a constant outer diameter over the entire axial length. Here, the term "constant" includes not only a case where it is accurately constant, but also a case where there is a variation to such an extent that the rotation of the shaft 51 does not become unstable due to a change in atmospheric pressure.

A plurality of (for example, three) dynamic pressure grooves 515 are arranged in the gas compression section 517 provided in the first dynamic pressure portion 501. That is, in the first dynamic pressure portion 501, one of the sleeve 52 and the shaft 51 has a plurality of dynamic pressure grooves 515 arranged in the circumferential direction. The dynamic pressure groove 515 is radially recessed from the outer peripheral surface 512a of the bearing portion 511a, and extends in the axial direction and the circumferential direction. The dynamic pressure groove 515 has a spiral shape in which the second dynamic pressure portion 502 side is located on the rear side in the rotation direction Rt of the shaft 51. That is, as shown in FIG. 14, the dynamic pressure groove 515 extends rearward in the rotation direction Rt of the shaft 51 toward the second dynamic pressure portion 502 of the shaft 51.

An angle of the dynamic pressure groove 515 intersecting a tangent of a cut shape obtained by cutting the outer peripheral surface 512a of the shaft 51a of the dynamic pressure groove 515 along a plane orthogonal to the central axis Cx is defined as an angle γ. That is, the dynamic pressure groove 515 is provided on the outer peripheral surface 512a of the shaft 51. The shaft 51a extends to the second dynamic pressure portion 502 as it goes forward in the rotation direction Rt of the shaft 51a. Since the dynamic pressure groove 515 is formed on the outer peripheral surface 512a of the shaft 51a, the dynamic pressure groove 515 can be processed easily. The angle γ is preferably 27° or more and 37° or less, like the angle θ when the dynamic pressure groove 524 is formed in the sleeve 52.

As illustrated in FIGS. 11, 14, and elsewhere, the angle γ of the dynamic pressure groove 515 arranged on the upper first dynamic pressure portion 501 and the angle γ of the dynamic pressure groove 515 arranged on the lower first dynamic pressure portion 501 are the same angle but in different directions. That is, the angle between the dynamic pressure groove 515 of one of the first dynamic pressure portions 501 and the surface orthogonal to the central axis Cx is the same as the angle between the dynamic pressure groove 515 of the other first dynamic pressure portion 501 and the surface orthogonal to the central axis Cx. Thereby, the pressure between the shaft 51 and the sleeve 52 tends to be vertically symmetrical, and the shaft 51 can be supported rotatably and stably.

Further, as shown in FIG. 13, when the center angles of the groove widths of the three dynamic pressure grooves 515 are β1, β2, and β3, in the shaft 51 of the present example embodiment, β1=β2=β3 is established. That is, the circumferential width of the dynamic pressure groove 515 is uniform. Here, the term "uniform" includes not only a case in which it is strictly uniform but also a case in which there are some variations. Then, the total β of the center angles of the dynamic pressure grooves 515 on the cross-section obtained by cutting the shaft 51a along a plane orthogonal to the central axis Cx is preferably 144° or more and 216° or less, like the angle α when the dynamic pressure grooves are formed in the sleeve 52.

In the gas dynamic pressure bearing 5, when the shaft 51 rotates inside the sleeve 52, an airflow that flows in the rotation direction of the shaft 51 is generated in the gap between the shaft 51 and the sleeve 52. In the first dynamic pressure portion 501, the airflow generated by the rotation of the shaft 51 flows into the dynamic pressure groove 515. Then, the airflow flowing into the dynamic pressure groove 515 flows toward the second dynamic pressure portion 502 along the dynamic pressure groove 515 as the second airflow Af2.

In the gas compression section 517, three dynamic pressure grooves 515 are arranged side by side in the circumferential direction. A land portion 516 is formed in a portion between the dynamic pressure grooves 515 that are adjacent in the circumferential direction. The land portion 516 is part of a cylindrical shape having the same inner diameter as the outer cylinder portion 518. Here, the term "identical" includes a case where the values are exactly the same, and also includes a case where there are some variations to such an extent that the rotation of the shaft 51 does not become unstable due to a change in the atmospheric pressure. The configurations of the gas compression section 517 and the dynamic pressure groove 515 are not limited to the above-described configurations. Any shapes capable of sending gas into the second dynamic pressure portion 502 by rotation of the shaft 51 can be widely used.

By providing the dynamic pressure groove 515 on the shaft 51a, it is possible to increase the gas pressure in the gap between the shaft 51a and the sleeve 52a of the second dynamic pressure portion 502, thereby supporting the shaft 51a stably and rotatably.

Figure 15:
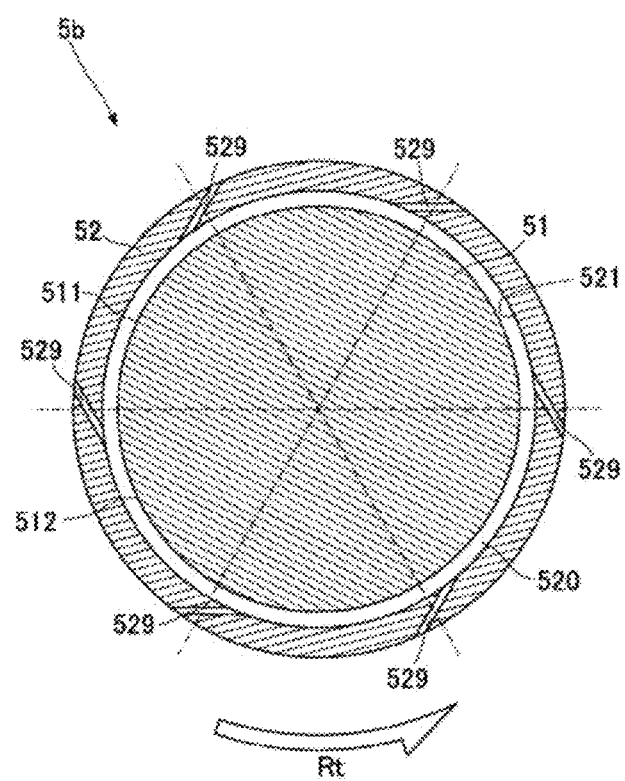
FIG. 15 is a sectional view showing a vent of a gas dynamic pressure bearing according to a modification of an example embodiment of the present disclosure.

FIG. 15 is a sectional view showing a vent 529 of a gas dynamic pressure bearing 5b according to a modification of the present disclosure. The gas dynamic pressure bearing 5b is the same as the gas dynamic pressure bearing 5 except that the vent 529 is different from the vent 527. Therefore, the substantially same parts of the gas dynamic pressure bearing 5b as those of the gas dynamic pressure bearing 5 are denoted by the same reference numerals, and detailed description of the same parts is omitted.

As shown in FIG. 15, the vent 529 of the gas dynamic pressure bearing 5b extends forward in the rotation direction of the shaft 51 toward the inside in the radial direction. Accordingly, when gas is sucked by the airflow generated by the rotation of the shaft 51, the resistance is reduced. Further, the air sucked from the vent 529 can smoothly join the airflow in the rotation direction of the shaft 51. From the above, gas can be efficiently sucked from the vent 529, and variation in pressure in the second dynamic pressure portion 502 can be suppressed.

While the example embodiments of the present disclosure have been described above, the example embodiments can be modified and combined in various ways within the scope of the present disclosure.

According to the present disclosure, for example, it can be used as a blower that blows cooling air to an electronic device.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A gas dynamic pressure bearing comprising:
   a shaft centered on a central axis extending in an up-down direction; and
   a sleeve that faces at least a portion of the shaft in a radial direction; wherein
   the portion in which the sleeve and the shaft face each other in the radial direction includes:
   a first dynamic pressure portion located at each of both ends in an axial direction; and
   a second dynamic pressure portion located between the first dynamic pressure portions;
   in the first dynamic pressure portion, one of the sleeve and the shaft includes a plurality of dynamic pressure grooves arranged in a circumferential direction; and
   a sum of center angles of groove widths of the dynamic pressure grooves in a cross-section cut along a plane orthogonal to the central axis is about 144° or more and about 216° or less.

2. The gas dynamic pressure bearing according to claim 1, wherein each of the dynamic pressure grooves is provided on an inner peripheral surface of the sleeve, and extends forward in a rotation direction of the shaft toward the second dynamic pressure portion.

3. The gas dynamic pressure bearing according to claim 1, wherein each of the dynamic pressure grooves is provided on an outer peripheral surface of the shaft, and extends rearward in a rotation direction of the shaft toward the second dynamic pressure portion.

4. The gas dynamic pressure bearing according to claim 1, wherein an angle between each of the dynamic pressure grooves and a plane orthogonal to the central axis is about 27° or more and about 37° or less.

5. The gas dynamic pressure bearing according to claim 1, wherein an angle between the dynamic pressure groove of one of the first dynamic pressure portions and a surface orthogonal to the central axis is equal to an angle between the dynamic pressure groove of another one of the first dynamic pressure portions and a surface orthogonal to the central axis.

6. The gas dynamic pressure bearing according to claim 1, wherein an outer diameter of the sleeve is at least about 1.2 times an inner diameter of the sleeve.

7. The gas dynamic pressure bearing according to claim 1, wherein
   the sleeve includes a sleeve extension that extends toward an end in the axial direction beyond the first dynamic pressure portion; and
   the sleeve extension includes a vent that connects an outside and an inside in the radial direction of the sleeve so as to allow ventilation.

8. The gas dynamic pressure bearing according to claim 7, wherein the vent extends forward in the rotation direction of the shaft as the vent extends radially inward.

9. A motor comprising:
   the gas dynamic pressure bearing according to claim 1;
   a stator provided to an outer surface of the sleeve; and
   a rotor that is fixed to an upper end of the shaft, and faces the stator in a radial direction.

10. A blower comprising:
    the motor according to claim 9; and
    an impeller attached to the rotor.

* * * * *